US011676368B2

(12) United States Patent
O'Brien et al.

(10) Patent No.: US 11,676,368 B2
(45) Date of Patent: Jun. 13, 2023

(54) IDENTIFYING ANOMALOUS ACTIVITY FROM THERMAL IMAGES

(71) Applicant: Optum Services (Ireland) Limited, Dublin (IE)

(72) Inventors: Megan O'Brien, Nass (IE); Damian Kelly, Kilcock (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 253 days.

(21) Appl. No.: 16/917,495

(22) Filed: Jun. 30, 2020

(65) Prior Publication Data
US 2021/0406698 A1    Dec. 30, 2021

(51) Int. Cl.
*G06N 3/08* (2006.01)
*G06N 3/04* (2006.01)
(Continued)

(52) U.S. Cl.
CPC .......... *G06V 10/762* (2022.01); *G06F 18/214* (2023.01); *G06F 18/217* (2023.01);
(Continued)

(58) Field of Classification Search
CPC ...... G06V 20/41; G06V 10/762; G06V 20/52; G06V 40/161; G06V 40/172; G06V 40/23; G06V 40/25; G06V 10/82; G06V 10/143; G06K 9/6262; G06K 9/6218; G06K 9/6256; G06N 3/0454; G06N 3/088; G06N 20/00; G06T 2207/10048; G06T 2207/10028
See application file for complete search history.

(56) References Cited

U.S. PATENT DOCUMENTS 9,380,224 B2    6/2016    Keskin et al.
9,530,080 B2    12/2016   Glazer
(Continued)

FOREIGN PATENT DOCUMENTS

WO    2013052383 S1    4/2013
WO    2019196934 A1    10/2019

OTHER PUBLICATIONS

"AI-powered cameras make thermal imaging more accessible," Engadget, accessed from https://www.engadget.com/2016/04//18/flir-ad-movidius-ai-thermal-camera-module/on Mar. 6, 2020, 14 pp.
(Continued)

*Primary Examiner* — Kenny A Cese
(74) *Attorney, Agent, or Firm* — Shumaker & Sieffert, P.A.

(57) ABSTRACT

A computing system may train an autoencoder to generate a first set of codes from a first set of thermal video images of activities of a user in an environment. The activities may represent routine behaviors of the user in the environment. The computing system may use an unsupervised machine-learning algorithm to categorize the first set of codes into a set of clusters. The computing system may use the autoencoder to determine a code representative of a second set of thermal video images of an activity in the environment. Based on the code not being associated with any cluster in the set of clusters, the computing system may determine that the code is an anomalous code. The computing system may perform an alert action based on the anomalous code.

19 Claims, 9 Drawing Sheets

(51) Int. Cl.

| | |
|---|---|
| *G06V 20/52* | (2022.01) |
| *G06V 10/82* | (2022.01) |
| *G06V 10/762* | (2022.01) |
| *G06N 3/088* | (2023.01) |
| *G06F 18/23* | (2023.01) |
| *G06F 18/214* | (2023.01) |
| *G06F 18/21* | (2023.01) |
| *G06N 3/045* | (2023.01) |
| *G06V 20/40* | (2022.01) |

(52) U.S. Cl.
CPC ............ *G06F 18/23* (2023.01); *G06N 3/045* (2023.01); *G06N 3/088* (2013.01); *G06V 20/41* (2022.01); *G06V 20/52* (2022.01); *G06V 10/82* (2022.01)

(56) References Cited

U.S. PATENT DOCUMENTS

| | | | |
|---|---|---|---|
| 9,851,230 | B2 | 12/2017 | Gestner et al. |
| 10,187,413 | B2 | 1/2019 | Vasseur et al. |
| 10,349,493 | B2 | 7/2019 | Gharabegian |
| 10,432,897 | B2 | 10/2019 | Carey |
| 10,496,905 | B2 | 12/2019 | Solomon et al. |
| 10,924,755 | B2 | 2/2021 | Ren et al. |
| 10,956,300 | B1* | 3/2021 | Yamane ................... G06N 5/04 |
| 10,992,752 | B2 | 4/2021 | Graefe et al. |
| 11,334,036 | B2 | 5/2022 | Yang et al. |
| 11,455,532 | B2 | 9/2022 | Kelly et al. |
| 2015/0180894 | A1 | 6/2015 | Sadovsky et al. |
| 2015/0302310 | A1* | 10/2015 | Wernevi ................. G16H 50/20 706/12 |
| 2017/0298597 | A1 | 10/2017 | Hammond |
| 2018/0039745 | A1 | 2/2018 | Chevalier et al. |
| 2018/0181111 | A1* | 6/2018 | Cussonneau ......... G05B 23/024 |
| 2018/0329375 | A1 | 11/2018 | Gharabegian |
| 2019/0026761 | A1* | 1/2019 | Jain ..................... G06Q 30/0202 |
| 2019/0180398 | A1* | 6/2019 | Chen ..................... G06Q 50/265 |
| 2019/0319868 | A1 | 10/2019 | Svennebring et al. |
| 2019/0380662 | A1* | 12/2019 | Kwan ...................... A61B 5/746 |
| 2020/0004583 | A1 | 1/2020 | Kelly et al. |
| 2020/0177470 | A1* | 6/2020 | Kuo ........................ H04L 41/16 |
| 2020/0371491 | A1 | 11/2020 | Wong |
| 2021/0043058 | A1 | 2/2021 | Williams et al. |
| 2021/0153814 | A1* | 5/2021 | DeMazumder ........ G16H 50/50 |
| 2021/0247483 | A1 | 8/2021 | Wang et al. |
| 2021/0281491 | A1 | 9/2021 | Yelahanka Raghuprasad et al. |
| 2021/0295147 | A1 | 9/2021 | Kelly et al. |
| 2021/0297453 | A1 | 9/2021 | Crabtree et al. |
| 2021/0302621 | A1 | 9/2021 | Brown |
| 2021/0406698 | A1 | 12/2021 | O'Brien et al. |
| 2022/0159403 | A1 | 5/2022 | Sporer et al. |

OTHER PUBLICATIONS

Courbariaux et al., "Binarized Neural Networks: Training Neural Networks with Weights and Activations Constrained to +1 or −T", arXiv:1602.02830v3, Feb. 9, 2016, 11 pp.

Nasif et al., "The Deep Learning Solutions on Lossless Compression Methods for Alleviating Data Load on IoT Nodes in Smart Cities", Sensors, vol. 21, MDPI, Jun. 20, 2021, 27 pp.

Tensorflow, "For Mobile & Edge", 6 pp., Retrieved from the Internet on Aug. 11, 2022 from URL: https://www.tensorflow.org/lite.

U.S. Appl. No. 17/658,985, filed Apr. 12, 2022, naming inventors Kelly et al.

Baradel et al., "Glimpse Clouds: Humans Activity Recognition from Unstructured Feature Points," Proceedings of the IEEE Conference on Computer Vision and Pattern Recognition (CVPR), Aug. 2018, 10 pp.

Cho et al., "Deep Thermal Imaging: Proximate Material Type Recognition in the Wild through Deep Learning of Spatial Surface Temperature Patterns," Proceedings of the 2018 CHI Conference on Human Factors in Computing Systems, Cornell University, Mar. 6, 2018.

Jiang et al., "Abnormal Event Detection From Surveillance Video By Dynamic Hierarchical Clustering," ICIP 2007, retrieved on Dec. 3, 2008, 4 pp.

Karantzoulidis, "How Advancements in Thermal Camera Tech Are Heating Up Opportunities—Security Sales and Integration," retrieved from https://www.securitysales.com/surveillance/advacements-thermal-camera-tech-opportunities/, Apr. 9, 2018, 11 pp.

Luo et al., "Computer Vision-Based Descriptive Analytics of Seniors' Daily Activities for Long-Term Health Monitoring," Machine Learning for Healthcare, Proceedings of Machine Learning Research 85:1.

Nogas et al., "DeepFall—Non-invasive Fall Detection with Deep Spatio-Temporal Convolutional Autoencoders," Journal of Healthcare Informatics Research 4(3), Mar. 2020.

Alcaláet al., "Assessing Human Activity in Elderly People Using Non-Intrusive Load Monitoring", Sensors, vol. 17, No. 2, Feb. 11, 2017, pp. 1-17.

Akl et al., "Unobtrusive Detection of Mild Cognitive Impairment in Older Adults Through Home Monitoring", IEEE Journal of Biomedical and Health Informatics, vol. 21, No. 2, Mar. 2017, pp. 339-348.

Carboni et al., "Contextualising Water Use in Residential Settings: A Survey of Non-Intrusive Techniques and Approaches", Sensors, vol. 16, May 20, 2016, pp. 1-20.

Fogarty et al., "Sensing From the Basement: A Feasibility Study of Unobtrusive and Low-Cost Home Activity Recognition", UIST '06: Proceedings of the 19th annual ACM symposium on User interface software and technology, Oct. 2006, pp. 91-100.

Guralnik et al., "Event Detection from Time Series Data", Proceedings of the Fifth ACM SIGKDD International Conference on Knowledge Discovery and Data Mining, Aug. 1999, pp. 33-42.

Jebb et al., "Time Series Analysis for Psychological Research: Examining and Forecasting Change", Frontiers in Psychology, vol. 6, Jun. 9, 2015, pp. 1-24.

Kalantarian et al., "Monitoring Eating Habits Using a Piezoelectric Sensor-Based Necklace", Computers In Biology and Medicine, vol. 58, Jan. 9, 2015, pp. 46-55.

Madokoro, Hirokazu, "Piezoelectric Sensors Used for Daily Life Monitoring", Piezoelectricity—Organic and Inorganic Materials and Applications, Aug. 19, 2018, pp. 103-123.

Natta et al., "Soft and Flexible Piezoelectric Smart Patch for Vascular Graft Monitoring Based on Aluminum Nitride Thin Flm", Scientific Reports, vol. 9, No. 8392, Jun. 10, 2019, pp. 1-10.

Nguyen et al., "Water End-Use Classification with Contemporaneous Water-Energy Data and Deep Learning Network", International Journal of Information, Control and Computer Sciences, Nov. 5, 2017, pp. 1-6.

Ueno, "A Piezoelectric Sensor Signal Analysis Method for Identifying Persons Groups", Sensors, vol. 19, No. 733, Feb. 2019, p. 12.

\* cited by examiner

IDENTIFYING ANOMALOUS ACTIVITY FROM THERMAL IMAGES

BACKGROUND

To support a private and safe living environment for people vulnerable to health or security risks, a variety of technologies enable healthcare and security services to monitor behavior. Existing technologies include wearables (e.g., alarm necklaces, watches, belt-clips, etc.), sensors, RGB video cameras, and non-RGB video cameras. The technologies relay information about the user to a services provider, who determines the health or safety of the user's situation.

SUMMARY

The present disclosure describes devices, systems, and methods that enable monitoring a user's behavior in an environment while maintaining aspects of the user's privacy. According to aspects of this disclosure, a computing system receives thermal images from thermal imaging cameras in a user's environment, compresses the images into codes, and organizes the codes systematically such that, upon receiving a new thermal image depicting abnormal behavior, the computing system recognizes the image as abnormal behavior and responds to the user.

In some instances, techniques may be used for distinguishing types of behavior of a user in an environment, including distinguishing routine behavior from abnormal behavior. In some cases, the user may be an elderly person and the environment may be the user's home, where the computing system recognizes common activities such as cooking, sleeping, or watching TV, but does not recognize uncommon actions, like tripping or falling. Furthermore, routine behavior at one point in time (e.g., during the day) may be abnormal behavior at another point in time (e.g., during the night), such as an elderly person walking around a garage at 3:00 AM. In other cases, the user may be a community of apartment residents, and the environment may be a shared garage, where the computing system recognizes common activities such as parking a car, walking to a car, or unloading a car, but does not recognize uncommon actions, like walking from car to car or standing still for an hour.

In such instances, thermal imaging cameras may be installed in the environment to collect records of activity. In this way, the environment may be monitored while maintaining aspects of the user's privacy by precluding the use of video cameras. Furthermore, monitoring with thermal imaging cameras avoids requiring the user to wear a monitoring device, such as a necklace, watch, or belt-clip, which may be difficult to remember or may cause discomfort.

According to this disclosure, images from the thermal imaging cameras are processed by machine-learning algorithms. The images are encoded via an autoencoder, thus compressing the data and reducing power requirements for computation. The encoded images are clustered via an unsupervised learning algorithm based on similarities and differences between the encoded images, thereby obviating a need for labelling images in a training data set, which traditionally entails a large effort.

In one aspect, this disclosure describes a method that comprises training an autoencoder to generate a first set of codes representative of a first set of thermal video images, categorizing the first set of codes into a set of clusters, determining a code representative of a second set of thermal video images, determining that the code is an anomalous code, and performing an alert action based on the anomalous code.

In another aspect, this disclosure describes a system including a memory and one or more processors in communication with the memory. The one or more processors are configured to train an autoencoder to generate a first set of codes representative of a first set of thermal video images stored in the memory, categorize the first set of codes into a set of clusters, determine a code representative of a second set of thermal video images, determine that the code is an anomalous code, and perform an alert action based on the anomalous code.

In yet another aspect, this disclosure describes a non-transitory computer-readable medium including instructions that, when executed, cause one or more processors to train an autoencoder to generate a first set of codes representative of a first set of thermal video images, categorize the first set of codes into a set of clusters, determine a code representative of a second set of thermal video images, determine that the code is an anomalous code, and perform an alert action based on the anomalous code.

DETAILED DESCRIPTION

Figure 1:
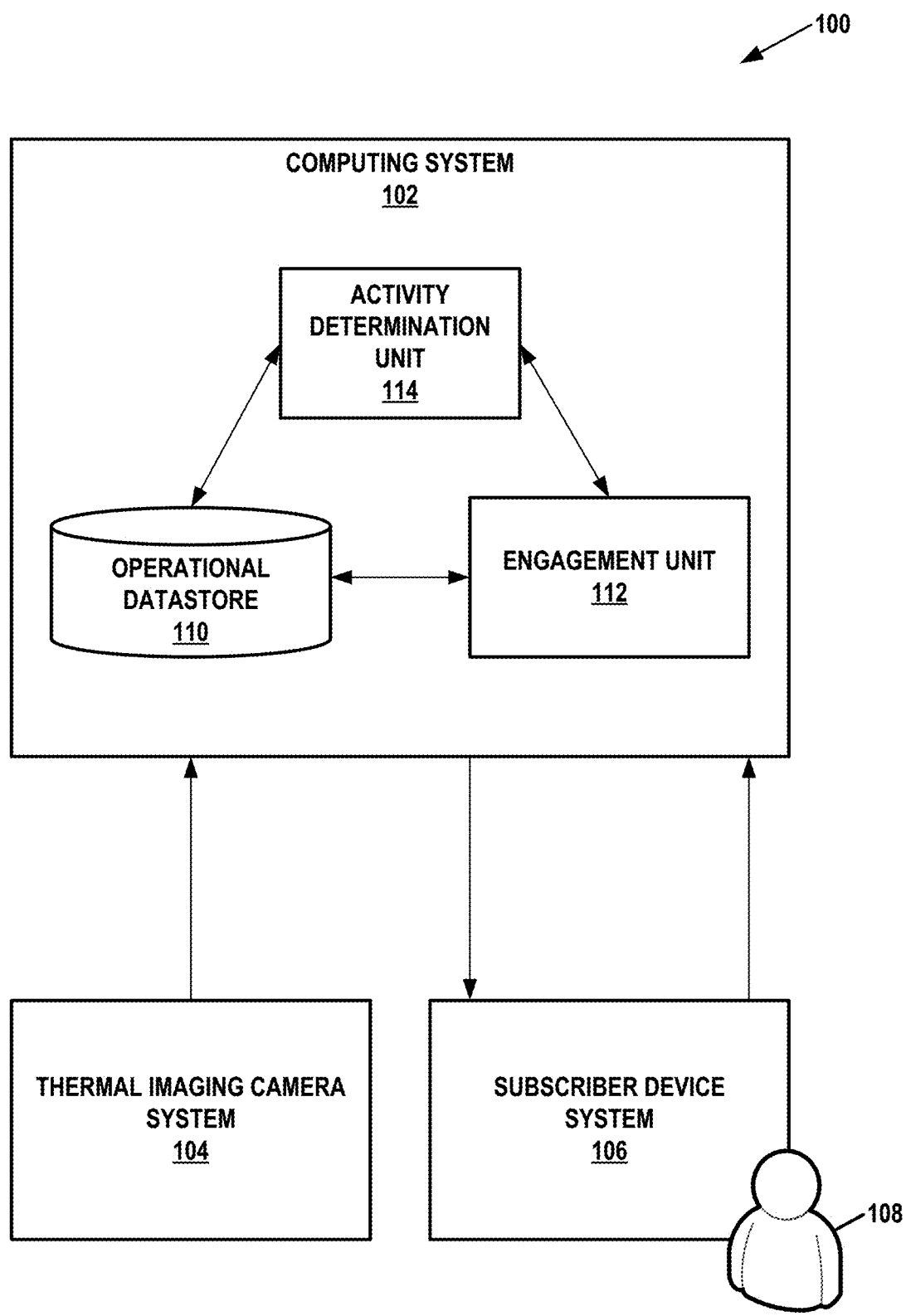
FIG. 1 is a block diagram illustrating an example system in accordance with one or more aspects of this disclosure.

FIG. 1 is a block diagram illustrating an example system 100 in accordance with one or more aspects of this disclosure. In the example of FIG. 1, system 100 includes computing system 102, thermal imaging camera system 104, and subscriber device system 106. In other examples, system 100 may include more, fewer, or different components. For instance, in some examples, thermal imaging camera system may be included within computing system 102. In some examples, system 100 may include additional subscriber device systems and/or one or more additional computing systems.

Computing system 102 may include one or more computing devices. In examples where computing system 102 includes two or more computing devices, the computing devices of computing system 102 may act together as a system. Example types of computing devices include server devices, personal computers, handheld computers, intermediate network devices, data storage devices, and so on. In examples where computing system 102 includes two or more computing devices, the computing devices of computing system 102 may be geographically distributed or concentrated together (e.g., in a single data center).

Similarly, thermal imaging camera system 104 may comprise one or more thermal imaging cameras. In examples where thermal imaging camera system 104 includes two or more thermal imaging cameras, the computing devices of thermal imaging camera system 104 may act together as a system. In examples where thermal imaging camera system 104 includes two or more thermal imaging cameras, the thermal imaging cameras may be geographically distributed (e.g., amidst rooms of a house, levels of a parking ramp, stations of a warehouse, etc.) or may be concentrated together (e.g., in a single area from different angles).

Similarly, subscriber device system 106 may comprise one or more computing devices. In examples where subscriber device system 106 includes two or more computing devices, the computing devices of subscriber device system 106 may act together as a system. Examples of computing devices include smart speakers, mobile phones (e.g., smartphones), smart watches, personal computers, handheld computers, and so on. In examples where subscriber device system 106 includes two or more computing devices, the computing devices of subscriber device system 106 may be geographically distributed (e.g., local and/or remote from subscriber 108) or concentrated together.

Computing system 102, thermal imaging camera system 104, and subscriber device system 106 may communicate via one or more communication networks. For instance, in some examples, computing system 102, thermal imaging camera system 104, and/or subscriber device system 106 may communicate via a wide area network, such as the Internet. Additionally or alternatively, computing system 102, thermal imaging camera system 104, and/or subscriber device system 106 may communicate with a local area network, such as Ethernet. The communication networks may include one or more wireless or wire-based communication links.

Computing system 102 may be operated by or on behalf of a community or an organization interested in monitoring an environment where activity is patterned and/or predictable and where a new activity may signify a need for help promptly. Simultaneously, the organization may be interested in maintaining aspects of the privacy of the occupants of the environment. As one example, a healthcare provider may be interested in monitoring the activity of patients where health risks are prevalent but the constant presence of a personal care assistant is not necessary or desired (e.g., in a private residence, in a nursing home, in a hospital room, etc.). For instance, the healthcare provider may be interested in identifying immediately when an elderly person falls down the stairs so that emergency responders may be dispatched to the person's aid as soon as possible. As another example, a security provider may be interested in monitoring the activity of clients where safety risks are present but a personal bodyguard is not necessary or desired (e.g., a private property, a gym locker room, a parking ramp, etc.). For instance, the security provider may be interested in identifying immediately when a person is trying to open doors on every vehicle in a parking ramp so that security personnel may intervene promptly before a car theft is perpetrated.

Computing system 102 may enable monitoring with low-resolution images, thus preserving aspects of privacy, and with low computation requirements, thus preserving energy. In some monitoring systems, monitoring requires video cameras and/or human workers assigned to watching an environment, which encroaches on the privacy of the occupants of the environment. In contrast, computing system 102 uses thermal imaging cameras, which may preserve information despite low resolution and may thus enable monitoring while maintaining aspects of privacy. In other monitoring systems, monitoring requires manually labelled data for a computing system to build a model, which requires intensive work before deploying the monitoring system. In contrast, computing system 102 does not need labels for training data, which may enable organization of data with reduced initial effort. In still other monitoring systems, monitoring requires processing high amounts of data, which entails large computational power and energy costs. In contrast, computing system 102 reduces data into codes, which may enable a high rate of processing with low computational power. In still other monitoring systems, monitoring is attempted by comparing data from one environment with data from another environment, which risks poor-quality recognition of irregular events. In contrast, computing system 102 detects irregular data by comparing data within the same environment, which may enable higher accuracy in detection of noteworthy events.

Computing system 102 may monitor an environment to detect irregularities in routine behavior of occupants of the environment. Computing system 102 is configured to train an autoencoder to generate a first set of codes representative of a first set of thermal video images, categorize the first set of codes into a set of clusters, determine a code representative of a second set of thermal video images, determine that the code is an anomalous code based on not being associated with any cluster in the set of clusters, and perform an alert action.

When an organization receives a request to monitor an environment, the organization may set up thermal imaging camera system 104 in the environment. The environment may be associated with a specific subscriber who frequents the environment. In some cases, the subscriber may be an individual. For example, the subscriber may be an individual with a physical disability, and the environment is the individual's home. In other cases, the subscriber may be two or more individuals. For example, the subscriber may be an elderly couple living at home together, and the environment is the home. In another example, the subscriber may be a community in an apartment complex, and the environment is a common facility. Setting up thermal imaging camera system 104 in the environment may require the permission of the subscriber.

The organization may monitor the environment for uncommon events. For example, a subscriber in an environment may engage in repetitive activities, such as walking, cooking, reading a book, watching TV, and so on. In some cases, the subscriber may continue those repetitive activities for a long time (e.g., for weeks, months, or years). The repetitive activities may be known as activities of daily living (ADL) and considered routine behavior. In other cases, the subscriber may interrupt the routine behavior with a noteworthy event, such as falling and lying still on the floor for a long period of time, or abnormal behavior potentially representative of cognitive decline, such as wandering in and out of a room several times. The organization may assess a deviation from normal behavior and quickly (e.g., over a period of seconds or minutes) determine that the deviation is indicative of, for example, a noteworthy event. Alternatively, the organization may assess deviations from normal behavior over a long time period (e.g., several months) before determining that the deviations are indicative of, for example, abnormal behavior corresponding to cognitive decline. In monitoring the subscriber, the organization may be able to intervene proactively in response to the noteworthy event or abnormal behavior instead of waiting a longer time for the subscriber or someone witnessing the subscriber to report the new activity.

Thermal imaging camera system 104 provides continuous data about the environment and the activities of subscriber 108 in the environment. Thermal imaging camera system 104 detects infrared radiation and generates electrical signals representing a pattern of the detected infrared radiation. Thermal imaging camera system 104 may thus provide data about heated objects, such as human beings, in the environment. Thermal imaging camera system 104 may provide data about heat without additional details about the environment or subscriber 108, which may enable subscriber 108 to maintain specific privacy aspects despite monitoring. The data may be communicated to computing system 102 as a series of images captured at a frame rate (e.g., 9 Hz, 30 Hz, 60 Hz, etc.). The data may be of low resolution, thus helping to preserve the subscriber's privacy. Equivalently, another camera, such as a depth sensing camera, that produces an anonymized image of human activity may replace the thermal imaging camera of thermal imaging camera system 104 to obtain satisfactory input for computing system 102.

Computing system 102 receives the images and then stores the images in operational datastore 110. Computing system 102 may match the images to an account unique to subscriber 108. Activity determination unit 114 of computing system 102 trains an autoencoder with a first set of the images, where the autoencoder learns distinguishing characteristics of the images and outputs codes that store the image data. The codes may reduce the data, which may enable compact storage and efficient processing. In some cases, one code may be mapped to each image. In other cases, one code may be mapped to two or more images, creating an average code representative of the plurality of images. The autoencoder may be unique to subscriber 108, such that the codes distinctively represent data from subscriber 108.

When plotted, the codes generated by the autoencoder may form clusters corresponding to features, activities, and/or events in the environment of subscriber 108, such as movements of a human being, a heating oven, or an empty room. The features may be further related to a specific location and/or time in the environment. Activity determination unit 114 trains a model with a machine-learning algorithm to assign each code to a cluster. The machine-learning algorithm is unsupervised, so the codes may be categorized effectively without labels. The identified clusters represent routine behaviors or expected features of the environment of subscriber 108. For example, the routine behaviors may represent activities of daily living (ADL). In other cases, the routine behaviors may represent safe and/or regular activities in a facility. The model may be stored in operational datastore 110.

Computing system 102 may receive a second set of images from thermal imaging camera system 104. Activity determination unit 114 processes the images through the trained autoencoder, creating codes. In some cases, one code may be mapped to each image. In other cases, one code may be mapped to two or more images. Activity determination unit 114 processes the codes through the clustering model, categorizing the codes according to the clusters or determining that a code does not fit in any cluster and is therefore an outlier.

Computing system 102 may consider the outlier to have a high probability of being an actionable event, where the organization would take action to respond to the event. Computing system 102 may attempt to confirm that the outlier is an actionable event, warranting a response from the organization, by performing an alert action. An alert action includes sending a notification to subscriber device system 106.

In response to activity determination unit 114 determining that a code is an outlier, engagement unit 112 may send a notification to subscriber device system 106. Subscriber device system 106 may include one or more devices belonging to subscriber 108 and/or users associated with subscriber 108, such as friends or family of subscriber 108. In some cases, subscriber 108 may respond to the notification from engagement unit 112. In other cases, another user associated with subscriber 108 may respond.

The notification may be customized for each device of subscriber device system 106. For example, the device may be or may include an audio device, in which case the notification may include an audio notification. Additionally or alternatively, the device may have a display, in which case the notification may include a visual notification.

In some cases, the device of subscriber device system 106 has installed a special-purpose application to receive notifications from engagement unit 112. In such cases, engagement unit 112 may send the notification to an application programming interface (API) of the special-purpose application. The special-purpose application may, in response to receiving the notification, cause the device to output a message regarding the notification. For example, the special-purpose application may cause the device to output a banner message for display, to read the message aloud, to generate a notification sound, to provide haptic vibration, and/or otherwise to notify subscriber 108 of the arrival of the notification. The special-purpose application may output a user interface for display that includes features allowing subscriber 108 to provide user input that indicates whether subscriber 108 has experienced an actionable event. Accordingly, the special-purpose application may cause the device to generate and send a response notification indicating the user input. For instance, the special-purpose application may cause subscriber device system 106 to send the subscriber response to an API of engagement unit 112.

Engagement unit 112 may be configured to receive a response from subscriber device system 106 in a variety of forms. For example, if the responding device from subscriber device system 106 is an audio device, engagement unit 112 may receive an oral response (e.g., subscriber 108 may say, "Yes, I need help."). Additionally or alternatively, if the responding device from subscriber device system 106 is a device with a display, engagement unit 112 may receive a written response (e.g., subscriber 108 may type, "No help needed," or may click a "No" button in the special-purpose application). Engagement unit 112 may include a natural language processing module to interpret the response.

Computing system 102 may react to the response from subscriber device system 106 by alerting the organization and/or by updating data in operational datastore 110. For example, if computing system 102 does not receive a response from subscriber device system 106, engagement unit 112 alerts the organization of the actionable event. In another example, if computing system 102 receives a response from subscriber device system 106 confirming that an actionable event has occurred, engagement unit 112 alerts the organization of the event. In yet another example, if computing system 102 receives a response from subscriber device system 106 denying that an actionable event has occurred, engagement unit 112 may send a notification to subscriber device system 106 requesting an identification of the event. Subscriber 108 may provide an identification, and activity determination unit 114 may label the outlier code with the identification and store the outlier-identification pair in operational datastore 110.

Periodically, even in the absence of activity determination unit 114 determining that a code is an outlier, engagement unit 112 may send a notification to subscriber device system 106 requesting an identification of a feature, an activity, and/or an event in environment of subscriber 108. The feature, activity, and/or event may correspond with a cluster. For example, engagement unit 112 may send a notification via a smart speaker belonging to subscriber 108, asking, "What are you usually doing at 9:00 AM in your kitchen?" As another example, engagement unit 112 may send a notification as a text message to a mobile device belonging to subscriber 108, asking, "What is the hot item in the corner of your living room?" Engagement unit 112 may receive a response (e.g., an oral message or a written message) from subscriber device system 106 identifying the feature, activity, and/or event. For example, subscriber 108 may instruct a smart speaker to send a message to engagement unit 112 saying, "Usually I am using the toaster at 9 AM." As another example, subscriber 108 may send a message via the special-purpose application, writing, "The hot item in the living room is a fireplace." In this way, activity determination unit 114 may label the codes of the cluster with the identification from subscriber 108 and store the code-identification pairs in operational datastore 110.

Periodically, activity determination unit 114 may retrain the autoencoder and/or the clustering model with new images received from thermal imaging camera system 104. The autoencoder may determine new codes to represent the images, and the clustering model may determine new patterns in the codes. For example, new patterns may become apparent based on the identification information provided by subscriber 108. In some cases, the labels correspond exactly with clusters determined by the first clustering model. In other cases, a label may describe two or more clusters. In such cases, activity determination unit 114 may modify the clustering model to combine the two or more clusters into one cluster. That is, activity determination unit 114 may determine a first cluster of codes labelled with a name and a second cluster of codes labelled with a similar name, and may combine the first cluster and the second cluster into one cluster corresponding to the name. In still other cases, two or more labels may describe codes within one cluster. In such cases, activity determination unit 114 may modify the clustering model to separate the cluster into two or more clusters corresponding to the two or more labels. That is, activity determination unit 114 may determine codes in the cluster labelled with a first name and other codes in the cluster labelled with a second name, and may separate the codes labelled with the first name from the codes labelled with the second name by splitting the cluster into two clusters corresponding to the first and second names. In this way, activity determination unit 114 becomes more refined over time.

Activity determination unit 114 may build a classification model from the clusters based on labels provided by subscriber 108. Each cluster may correspond to a respective label referring to a feature, an activity, and/or an event in the environment. The classification model may further include outliers and corresponding labels. Thus, activity determination unit 114 may create a system of classes identifying routine and actionable behaviors. As a result, when the autoencoder maps one or more thermal images to a new code, the new code may be categorized into a class and identified as the feature, activity, and/or event corresponding to the class.

Activity determination unit 114 may, via the classification model, monitor the environment for a particular actionable event. For example, activity determination unit 114 may be configured to monitor for subscriber 108 falling down the stairs. The classification model may have a class corresponding to the outlier event of falling such that a new code representing a fall is classified as falling. In this way, activity determination unit 114 may determine that the new code represents falling without reaching out to subscriber 108. Engagement unit 112 may send a notification to subscriber device system 106 and to the organization, providing details of the fall as soon as the fall occurs, with minimal delay.

Additionally or alternatively, activity determination unit 114 may, via the classification model, provide records of routine behaviors over time. For example, if subscriber 108 is an adult in independent living, the classification model may show, without input from subscriber 108, what ADL subscriber 108 partakes in. In some cases, identifying ADL may provide a measurement for the ability of subscriber 108 to live independently. In other cases, identifying irregularities in ADL (e.g., using a bathroom several times in quick succession, missing mealtimes, not moving for long periods of time, etc.) may indicate cognitive decline. In still other cases, understanding the ADL of subscriber 108 may allow computing system 102 to supplement the abilities of subscriber 108 with additional help, such as a reminder to take a medication when in the kitchen.

Figure 2:
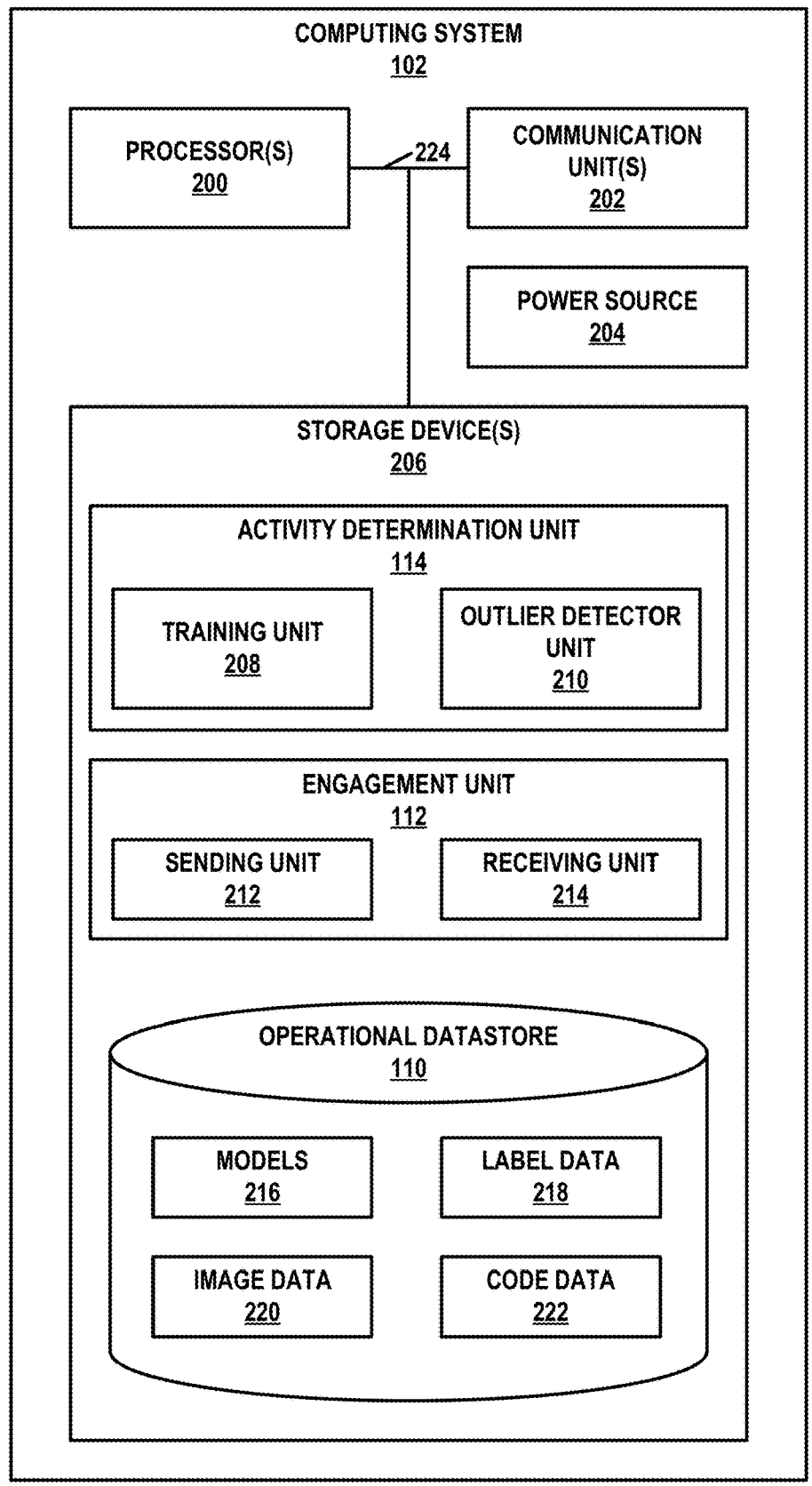
FIG. 2 is a block diagram illustrating example components of a computing system in accordance with one or more aspects of this disclosure.

FIG. 2 is a block diagram illustrating example components of computing system 102 in accordance with one or more aspects of this disclosure. FIG. 2 illustrates only one example of computing system 102, without limitation on many other example configurations of computing system 102.

As shown in the example of FIG. 2, computing system 102 includes one or more processor(s) 200, one or more communication unit(s) 202, a power source 204, one or more storage device(s) 206, and one or more communication channels 224. Computing system 102 may include other components. For example, computing system 102 may include input devices, output devices, display screens, and so on. Communication channel(s) 224 may interconnect each of components 200, 202, and 206 for inter-component communications (physically, communicatively, and/or operatively). In some examples, communication channel(s) 224 may include a system bus, a network connection, an inter-process communication data structure, or any other method for communicating data. Power source 204 may provide electrical energy to components 200, 202, and 206. Storage device(s) 206 may store information required for use during operation of computing system 102.

Processor(s) 200 comprise circuitry configured to perform processing functions. For instance, one or more of processor(s) 200 may be a microprocessor, application-specific integrated circuit (ASIC), field-programmable gate array (FPGA), or other type of processing circuit. In some examples, processor(s) 200 of computing system 102 read and may execute instructions stored by storage device(s) 206.

Communication unit(s) 202 may enable computing system 102 to send data to and receive data from one or more other computing devices (e.g., via a communications network, such as a local area network or the Internet). For instance, communication unit(s) 202 may be configured to send notifications to subscribers, receive subscriber responses, send notifications to organizations, and so on. In some examples, communication unit(s) 202 may include wireless transmitters and receivers that enable computing system 102 to communicate wirelessly with other computing devices. Examples of communication unit(s) 202 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 102 may use communication unit(s) 202 to communicate with one or more other computing devices or systems, such as thermal imaging camera system 104 and subscriber device system 106.

Storage device(s) 206 may store operational datastore 110. In the example of FIG. 2, operational datastore 110 may include models 216, label data 218, image data 220, code data 222, and/or other data. Models 216 may include a trained autoencoder, a clustering model, and/or a classification model. Label data 218 may include descriptions provided by subscriber 108 (e.g., descriptions of routine behaviors or abnormal events) and pairings between the descriptions and one or more codes. Image data 220 may include thermal images received from thermal imaging camera system 104 capturing features, activities, and/or events in the environment of subscriber 108. Code data 222 may include the output of an autoencoder, representing the thermal images.

Processor(s) 200 may read instructions from storage device(s) 206 and may execute instructions stored by storage device(s) 206. Execution of the instructions by processor(s) 200 may configure or cause computing system 102 to provide at least some of the functionality ascribed in this disclosure to computing system 102. As shown in the example of FIG. 2, storage device(s) 206 include computer-readable instructions associated with activity determination unit 114. Furthermore, in the example of FIG. 2, the computer-readable instructions associated with activity determination unit 114 may include computer-readable instructions associated with training unit 208 and outlier detector unit 210. Additionally, in the example of FIG. 2, storage device(s) 206 may include computer-readable instructions associated with engagement unit 112. The computer-readable instructions associated with engagement unit 112 may include computer-readable instructions associated with sending unit 212 and receiving unit 214.

Activity determination unit 114 is configured to determine behavior patterns of subscriber 108 and thus recognize abnormal behaviors. In some cases, activity determination unit 114 determines behavior patterns and takes no further action. In other cases, activity determination unit 114 determines behavior patterns, detects abnormal behavior, and enables engagement unit 112 to contact subscriber device system 106 and/or the organization associated with computing system 102. Activity determination unit 114 may determine behavior patterns and recognize abnormal behaviors from data in operational datastore 110, such as image data 220, code data 222, label data 218, models 216, and/or other data.

Activity determination unit 114 determines behavior patterns by employing training unit 208 to train models 216 based on image data 220, code data 222, and/or label data 218. Initially, activity determination unit 114 may collect data for a period of time (e.g., a few days, one or more weeks, etc.) and employ training unit 208 without monitoring for abnormal behavior. At other times, activity determination unit 114 may collect data, employ training unit 208, and monitor for abnormal behavior simultaneously.

Models 216 may be one or more machine learning models. In some examples, training unit 208 may train models 216 from one or more machine learning algorithms based on training data such as image data 220, code data 222, label data 218, and/or other data. For example, training unit 208 may train an autoencoder on image data 220 to compress image data 220, where image data 220 is the input and code data 222 is the output. As another example, training unit 208 may train a clustering model on code data 222 to determine related codes based on similar characteristics, without labels for the inputted code data 222. In some cases, training unit 208 may create a classification model by applying label data 218 to the codes. In other cases, training unit 208 may not have access to label data 218 because subscriber 108 has not provided identification of features, activities, or events corresponding to the codes. In such examples, training unit 208 may not create a classification model.

Once trained, models 216 may be able to organize image data 220 from thermal imaging camera system 104 into behavior patterns of subscriber 108. Recognition of behavior patterns may be based on distinguishing characteristics of image data 220 (e.g., characteristics that distinguish one image data 220 from other image data 220). For example, the autoencoder may compress image data 220 into code data 222 based on hotspots, cold spots, time, camera location, and other distinguishing characteristics. As another example, the clustering model may determine that subsets of code data 222 are more alike than other subsets of code data 222 and categorize the subsets accordingly into clusters. The clusters may correspond respectively to routine behaviors. For example, if the environment of subscriber 108 is a home, the clusters may correspond respectively to ADL, such as cooking, watching TV, or sleeping. As another example, if the environment of subscriber 108 is a gym locker room, the clusters may correspond respectively to changing clothes, showering, or using a restroom. After engagement unit 112 elicits feedback from subscriber 108 identifying the routine behaviors by name, the classification model may distinguish the clusters by classes based on label data 218. As a result, models 216 may recognize new codes as representative of routine behavior or abnormal behavior based on the distinguishing characteristics used to train models 216.

Image data 220 may include images of variations of temperature in the environment of subscriber 108. The images may have a certain width (e.g., 24 pixels, 32 pixels, etc.), a certain height (e.g., 24 pixels, 32 pixels, etc.), and three channels (e.g., red, green, and blue). The size of the image may correspond to the type of camera from thermal imaging camera system 104. The variations of temperature may show the movement of warm entities in a comparatively cool environment, such as a human body in a house at room temperature. Image data 220 may, for example, show nuances in the position of the human body, such as standing, sitting, lying down, walking, or climbing stairs. Image data 220 may further show a location of the human body, such as lying down on a bed or lying down on a floor. Image data 220 may include features of the source thermal video imaging camera of thermal imaging camera system 104, such as an ID or a location of the camera. With such data about the camera, image data 220 may provide additional detail in the location of the human body, such as lying down in a bedroom or lying down in a kitchen. Image data 220 may further include a date-time stamp. Image data 220 may be of high resolution or low resolution, where a low resolution may preserve aspects of the privacy of subscriber 108.

Code data 222 is a compression of image data 220, containing critical information of image data 220 to enable reconstructing the image data. Similar images from image data 220 may have similar codes in code data 222. In some examples, a code in code data 222 represents one image from image data 220. In other examples, a code in code data 222 represents two or more images from image data 220. Code data 222 may be a numerical representation of image data 220. For example, code data 222 may be in the form of a vector with a given length (e.g., 4 attributes, 10 attributes, 50 attributes, etc.), where a shorter length reduces the storage and processing requirements for computing system 102. In some cases, after the autoencoder produces code data 222, code data 222 is dimensionally reduced, such as by parametric t-SNE, PCA, or ICA algorithms. In other cases, code data 222 is the direct output of the autoencoder.

Label data 218 may include identifications of codes in code data 222. Subscriber 108 may provide identifications, stored as label data 218, via written message or audio message, as managed by engagement unit 112. In some cases, a label in label data 218 may correspond to a cluster of codes. In other cases, a label in label data 218 may correspond to an outlier from the clusters of codes. Computing system 102 may monitor subscriber 108 effectively without label data 218. Label data 218 may provide additional sensitivity (e.g., reduced false positives) and functionality to computing system 102.

Training unit 208 may apply image data 220 as input to an autoencoder neural network, such as a convolutional autoencoder. The autoencoder may include two parts, one part to encode an image as a code (i.e., the "encoder") and one part to decode the image from the code (i.e., the "decoder"). The encoder may include or consist of a number of layers of encoding blocks (e.g., one, four, or ten layers) with pooling methods (e.g., max pooling or average pooling), a flatten layer, and a dense layer to reduce resolution and increase effectiveness of the encoder. As a result, the encoder may produce a code from an image input. The decoder may include or consist of a number of layers of decoding blocks (e.g., one, four, or ten layers) with upsampling methods, followed by a final decoding block. As a result, the decoder may transform the code into an image with a size corresponding to a size of the image input. Training unit 208 may supply hyperparameters, such as a code size, a filter size, a stride size, a number of layers of the autoencoder, and a loss function (e.g., cross entropy, mean squared error, etc.). The autoencoder may learn distinguishing characteristics of image data 220 and use the characteristics to compress the data into codes, outputting code data 222. In some cases, code data 222 may be further dimensionally reduced, such as by parametric t-SNE, PCA, or ICA algorithms. In other cases, code data 222 may not be further dimensionally reduced.

Training unit 208 may then apply code data 222 as input to a machine learning algorithm, such as a K-means algorithm, to create the clustering model of models 216. Training unit 208 may further provide parameters for the machine learning algorithm (e.g., a number of clusters for the K-means algorithm, etc.). The K-means algorithm may identify natural groups of codes of code data 222, where the groups represent patterns in features, activities, and/or events of the environment of subscriber 108. In other examples, training unit 208 may apply code data 222 to a different machine learning algorithm, such as, for example, K-means++, bisecting K-means, expectation-maximization, self-organizing maps, agglomerative hierarchical (e.g., single-link, complete-link, or group average), shared nearest neighbors, Chameleon, DBSCAN, CLIQUE, CURE, DENCLUE, etc., to create the clustering model. The machine learning algorithm may determine a clustering model to output clusters of code data 222.

In some cases, training unit 208 may have access to label data 218 corresponding to codes based on clusters output by the clustering model. For example, subscriber 108 may provide identification of codes in a cluster via engagement unit 112, with the identification stored as label data 218. As another example, training unit 208 may apply artificial labels to the codes of clusters (e.g., "Group 1," "Group 2," etc.), with the artificial labels stored as label data 218. Training unit 208 may use labelled codes to build a classification model, such as with a decision tree, nearest neighbor, Naïve Bayes, rule-based, support vector machine (SVM), or neural network algorithm. In other cases, training unit 208 may not have access to label data 218 and may not build a classification model.

Training unit 208 may periodically retrain models 216. For example, training unit 208 may initially create models 216 based on a first subset of the training data (e.g., a first subset of image data 220, code data 222, and/or label data 218), and training unit 208 may subsequently retrain models 216 when appropriate using a second subset of the training data (e.g., a second subset of image data 220, code data 222, and/or label data 218). In some examples, the second subset may include some or all the training data included in the first subset. In other examples, the second training data set may not include any training data of the first subset (i.e., all new training data). After training unit 208 has retrained models 216, models 216 may be different than the previous models 216 trained using the first subset of the training data.

In some examples, training unit 208 may retrain models 216 on regular time intervals (e.g., monthly, bimonthly, biannually, etc.). In other examples, training unit 208 may retrain models 216 on an irregular basis, such as based on new labels added to label data 218. For instance, if subscriber 108 submits identification of a feature, activity, and/or event corresponding to a cluster or an outlier, training unit 208 may retrain models 216 to incorporate the new information. In some cases, training unit 208 may determine, in a cluster, codes labelled with a first name and codes labelled with a second name. In such cases, training unit 208 may separate the codes labelled with the first name from the codes labelled with the second name by splitting the first cluster into two clusters. For example, if subscriber 108 identifies one subset of codes as "cooking" and another subset of codes as "washing dishes," and the clustering model had originally joined the two subsets into a single cluster, then training unit 208 may retrain the autoencoder to recognize a characteristic differentiating the two activities in image data 220 and/or may retrain the clustering model to separate the corresponding codes into different clusters. In other cases, training unit 208 may determine codes labelled with a name in a first cluster and codes labelled with a similar name in a second cluster. In such cases, training unit 208 may combine the first cluster and the second cluster into one cluster. In other examples, additional or alternative situations may trigger the retraining of models 216 by training unit 208.

In some examples, training unit 208 monitors the sensitivity of models 216. For example, when engagement unit 112 sends a notification to subscriber device system 106 regarding a detected outlier, subscriber device system 106 may confirm or deny that the outlier corresponds to an actionable event. In some cases, subscriber device system 106 may confirm that the outlier corresponds to an actionable event, and training unit 208 may interpret the confirmation as a successful processing and classification of the input data. In other cases, subscriber device system 106 may deny that the outlier corresponds to an actionable event, and training unit 208 may interpret the denial as a failure to process and classify input data (i.e., a false positive). In such cases, training unit 208 may determine to retrain the autoencoder and/or the clustering model.

After activity determination unit 114 determines behavior patterns using training unit 208, activity determination unit 114 may monitor for abnormal behavior using outlier detector unit 210. Activity determination unit 114 may receive new image data 220 in real time or near-real time, store the data in operational datastore 110, and employ outlier detector unit 210 to analyze the data for abnormal behavior.

Outlier detector unit 210 may use models 216 to distinguish routine behaviors from abnormal behaviors of subscriber 108. When activity determination unit 114 obtains a new set of thermal images from thermal imaging camera system 104, outlier detector unit 210 applies the new set of thermal images to the autoencoder from models 216. The autoencoder outputs a new code comparable to the training codes in code data 222. Activity determination unit 114 may store the new code in operational datastore 110 as code data 222. Outlier detector unit 210 may then apply the new code to the clustering model of models 216 and determine a similarity of the new code to the clustered training codes.

Outlier detector unit 210 may determine a likelihood score based on a similarity measure, where the likelihood score reflects the probability that the new code represents the same feature, activity, and/or event as a cluster. In some cases, the measure may be a distance, such as the Euclidean distance, from the new code to the nearest code in a cluster, from the new code to the centroid of a cluster, or from the new code to each code in a cluster on average, where a lower distance correlates to a higher likelihood score. In other cases, the measure may be a density, such as the number of codes in a cluster within a certain radius of the new code, where a greater number of codes correlates to a higher likelihood score. In yet other cases, outlier detector unit 210 may determine a reconstruction error from decoding, using the decoder of the autoencoder of models 216, the new set of thermal images from the new code, where a higher reconstruction error (i.e., between the original new set of thermal images and the decoded new set of thermal images) correlates to a lower likelihood that the new code belongs to any cluster. Alternatively or additionally, outlier detector unit 210 may use other measures to determine the likelihood of the new code belonging to a cluster. Outlier detector unit 210 may determine a threshold likelihood score, such that if a new code satisfies the threshold likelihood score, then the new code likely belongs in a cluster.

In some cases, the new code is similar to codes in a cluster. In such cases, outlier detector unit 210 may determine that the new code is not an outlier and may categorize the new code as a member of the cluster. For example, if the new code has a likelihood score that satisfies the threshold likelihood score with one cluster, outlier detector unit 210 adds the new code to the cluster. As another example, if the new code has two or more likelihood scores that satisfy the threshold likelihood score with two or more respective clusters, outlier detector unit 210 may add the new code to the cluster with the highest likelihood score. Additionally or alternatively, outlier detector unit 210 may classify the new code according to the classification model, if training unit 208 has trained the classification model.

In other cases, the new code does not have a likelihood score that satisfies the threshold likelihood score with any cluster. In such cases, outlier detector unit 210 determines that the new code is an outlier.

After activity determination unit 114 determines behavior patterns and/or abnormal behaviors of subscriber 108 in the environment, engagement unit 112 may perform an alert action. The alert action may include engaging with subscriber device system 106 and/or with the organization associated with computing system 102. In some cases, performing the alert action may comprise prompting, via subscriber device system 106, a response to indicate whether an activity is an actionable event (i.e., the activity requires a responsive action by the organization associated with computing system 102). In other cases, engagement unit 112 may prompt subscriber 108 to provide an identification of a feature, activity, and/or event represented by a cluster of codes. In other cases, performing the alert action may include temporarily activating another recording device, such an RGB video camera, in the environment of subscriber 108 to provide more detailed information about an anomalous behavior. In some examples, engagement unit 112 may only perform the alert action for a cluster containing a minimum number of codes.

Engagement unit 112 may employ sending unit 212 to generate the alert action. In some cases, the alert action might be a generic message, such as, "We detected abnormal activity. Do you need help?" In such cases, sending unit 212 may use the same message to communicate about any outlier. In other cases, such as when prompting an identification of a feature, activity, and/or event represented by a cluster, sending unit 212 may produce a unique message, such as a message describing unique features of the cluster. For example, sending unit 212 may determine that a location, a time, a temperature, a shape, or another characteristic of the environment represented by the codes in the cluster distinguishes the cluster from other clusters, and may specify one or more distinguishing characteristics in the message.

Sending unit 212 may include a natural language processing unit to facilitate communication. For example, sending unit 212 may generate a message (e.g., a question, a greeting, a polite response, etc.) in an audio format, with the proper vocabulary and grammar used by subscriber 108 and/or the community of subscriber 108 associated with subscriber device system 106. As another example, sending unit 212 may generate a message (e.g., a question, a greeting, a polite response, etc.) in a written format, with appropriate spelling and punctuation.

After generating a message, sending unit 212 may determine a channel by which to send the message to each device in subscriber device system 106. For example, if the device is a mobile phone, sending unit 212 may send the written message as a text to the mobile phone. As another example, if the device is a smart speaker, sending unit 212 may send the audio message as a voice recording to the smart speaker.

Receiving unit 214 may receive one or more responses to the alert action generated by sending unit 212. In some cases, the response may come from subscriber 108. In other cases, the response may come from a trusted associate of subscriber 108 with access to subscriber device system 106. The responses may be in a variety of formats. For example, a response may be sent by text from a mobile phone in a written format. As another example, a response may be sent by a smart speaker in an audio format. In some cases, sending unit 212 may send a message to a certain device of subscriber device system 106, and receiving unit 214 may receive a response from a different device of subscriber device system 106. In other cases, sending unit 212 may send a message to a device of subscriber device system 106, and receiving unit 214 may receive a response from the same device.

Receiving unit 214 may interpret the response. Receiving unit 214 may include a natural language processing unit to facilitate communication. For example, receiving unit 214 may derive meaning from an audio message or from a written message.

Receiving unit 214 may analyze the response for significant content. For example, significant content may be a confirmation that an outlier corresponds to an actionable event (e.g., subscriber 108 has fallen at home and needs medical attention, subscriber 108 has been attacked at a public facility and needs security support, etc.). As another example, significant content may be a denial that an outlier corresponds to an actionable event. As yet another example, significant content may be an identification of a feature, activity, and/or event represented by a cluster. In some cases, receiving unit 214 may be unable to determine significant content, such as due to a lack of response or to an incoherent response. In such cases, receiving unit 214 may interpret the lack of significant content as confirmation that an outlier corresponds to an actionable event.

In some cases, based on the communication by sending unit 212 and receiving unit 214, engagement unit 112 determines that an event is actionable. In such cases, sending unit 212 may generate a message for the organization associated with computing system 102 to alert the organization of the actionable event. The message may be in a variety of formats, such as an audio format, a written format, or a binary signal format like an alarm.

In other cases, engagement unit 112 determines that the response, as interpreted by receiving unit 214, may be used as a label of code data 222. In such cases, engagement unit 112 may add the label to label data 218. As a result, training unit 208 may determine to retrain models 216 using label data 218.

Figure 3:
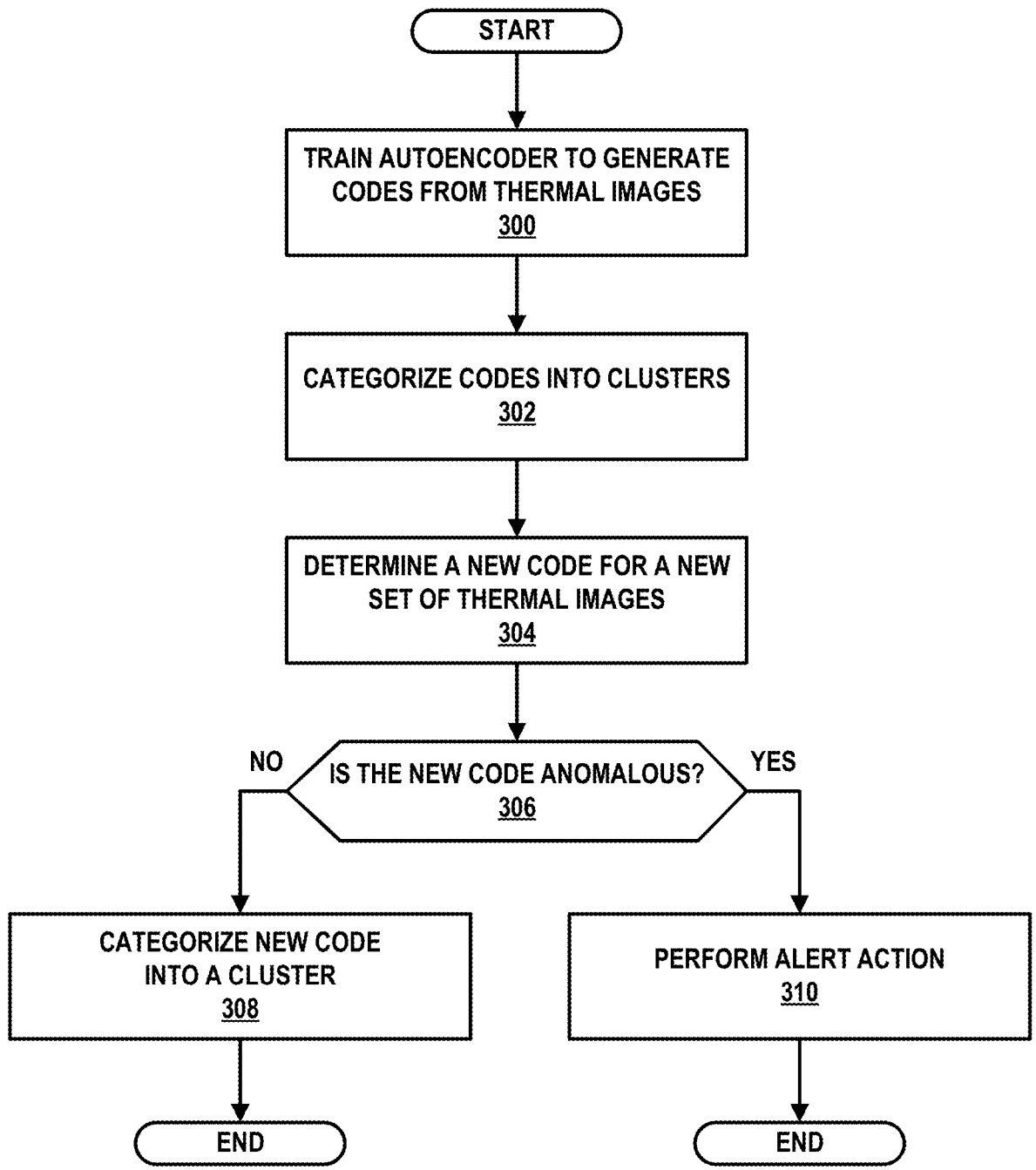
FIG. 3 is a flowchart illustrating an example operation in accordance with one or more aspects of this disclosure.

FIG. 3 is a flow diagram illustrating an example technique of monitoring an environment, in accordance with the disclosure. The operations shown in the flow diagram of this disclosure are provided as examples. In other examples, operations may include more, fewer, or different actions, and/or actions may be performed in different orders. The technique of FIG. 3 will be described with respect to computing system 102 of FIG. 2 for ease of description only. In other examples, other systems may be used to perform the technique of FIG. 3.

The technique of FIG. 3 includes activity determination unit 114 trains an autoencoder to generate codes from thermal images (300). For example, activity determination unit 114 may obtain thermal images from thermal imaging camera system 104 in an environment of subscriber 108, where subscriber 108 is showing routine behavior. Activity determination unit 114 may use a subset of the thermal images to train an autoencoder to compress the thermal images into codes. The autoencoder may learn to recognize distinguishing characteristics of the images. The codes may be based on such distinguishing characteristics. As a result, the trained autoencoder may receive, as input, thermal images from the environment and produce, as output, codes representative of the thermal images.

Activity determination unit 114 may then categorize the codes into clusters (302). For example, the autoencoder may produce codes representing routine behavior. Activity determination unit 114 may apply a subset of the codes to an unsupervised machine learning algorithm to distinguish clusters of similar codes, resulting in a clustering model. Each cluster in the clustering model may represent a component of the routine behavior of subscriber 108 in the environment (e.g., a routine feature, activity, or event).

Activity determination unit 114 may obtain one or more new thermal images and, using the autoencoder, produce a new code representative of the one or more new thermal images (304). For example, the autoencoder may produce one code from one thermal image. As another example, the autoencoder may produce one code from more than one thermal image. The autoencoder may produce similar codes from similar images, such that a new image that is not similar to images of routine behavior may result in a new code that is not similar to codes of routine behavior.

Activity determination unit 114 may determine whether the new code is anomalous (306). The new code may match previous codes, in which case the new code is not anomalous, or the new code may be substantively different from previous codes, in which case the new code is anomalous. In some cases, the one or more new thermal images show a continuation of routine behavior. In such cases, the new code may be similar to a cluster of codes. As a result, activity determination unit 114 may determine that the new code is not anomalous. Accordingly, based on activity determination unit 114 determining that the new code is not anomalous ("NO" branch of 306), activity determination unit 114 may categorize the new code in the similar cluster (308). In other cases, the one or more new thermal images show a new behavior. As a deviation from routine behavior, the new behavior potentially requires a responsive action from the organization associated with computing system 102. In such cases, the new code may not be similar to any cluster of codes. As a result, activity determination unit 114 may determine that the new code is anomalous ("YES" branch of 306) and perform an alert action based on the new code (310). For example, an alert action may be a notification to subscriber 108 to identify the new behavior and/or confirm whether the new behavior is an actionable event, such as requiring medical help or security support. As another example, the alert action may be a notification to the medical help or security support, reporting the new behavior.

Figure 4A:
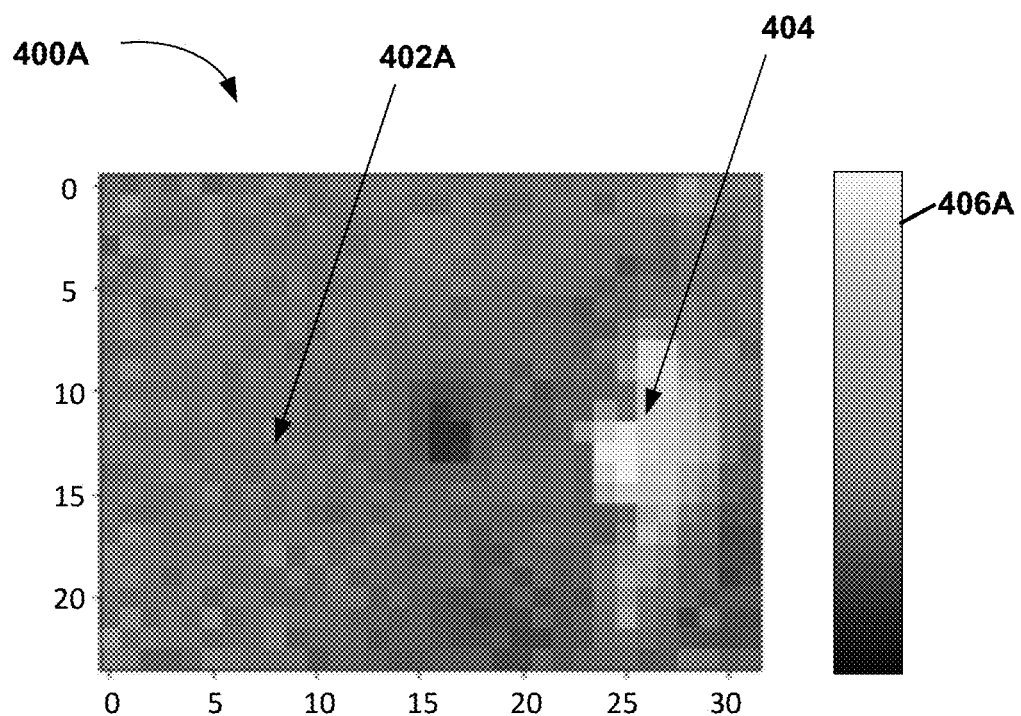
FIGS. 4A-B are example thermal video images of an environment monitored by thermal imaging cameras.
Figure 4B:
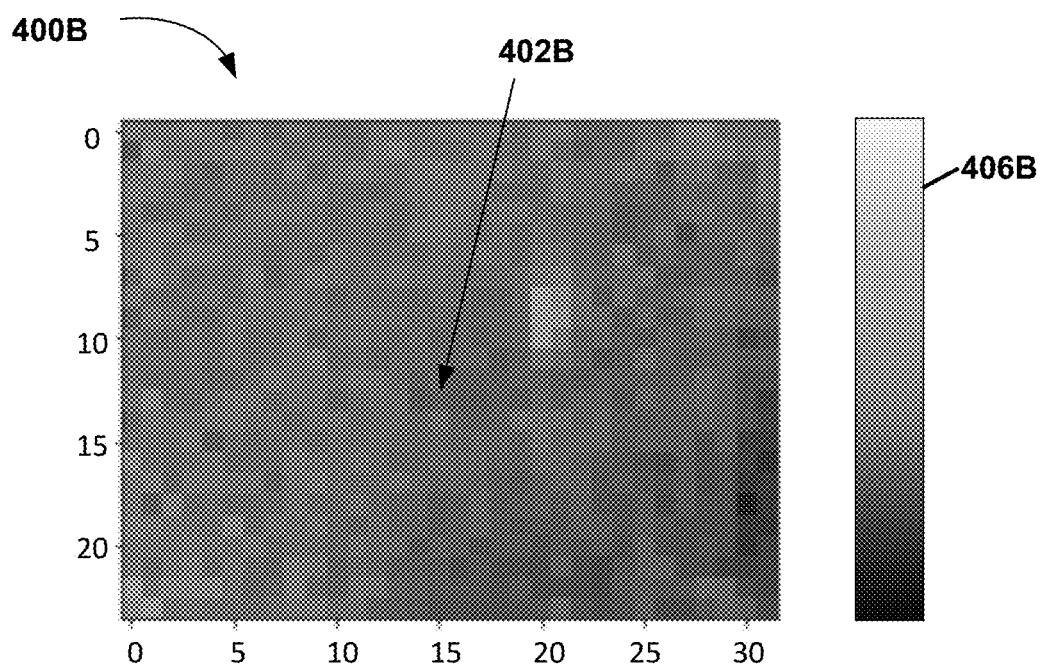

FIGS. 4A-B are example thermal images of an environment monitored by thermal imaging cameras (e.g., thermal imaging camera system 104), showing how variances in temperature may help monitor the behavior of a person (e.g., subscriber 108) in the environment.

FIG. 4A shows an example thermal image 400A with temperature scale 406A. Temperature scale 406A may show a spectrum of temperatures from low to high (represented as dark to light in the example of FIG. 4A). Thermal image 400A includes background 402A of moderate temperatures and feature 404 of relatively high temperatures. Thermal image 400A depicts a human (i.e., feature 404) in a room.

FIG. 4B shows an example thermal image 400B with temperature scale 406B. Temperature scale 406B may show a spectrum of temperatures from low to high (represented as dark to light in the example of FIG. 4B). Thermal image 400B includes background 402B of moderate temperatures. Thermal image 400B depicts an empty room.

Images 400A-B may demonstrate the opportunity for computing system 102 to distinguish the behavior of subscriber 108. The presence of a relatively warm object (e.g., a human in a cooler room) is detectable as feature 404 in image 400A. Images taken over time may suggest that feature 404 is mobile and can change position and orientation. For example, image 400A shows that feature 404 is long and upright (e.g., a human standing up). As another example, an image may show feature 404 on the left side of the image (e.g., a human having moved). As yet another example, an image may show feature 404 bent at right angles (e.g., a human sitting down). Other images may show other positions and orientations of feature 404. Similarly, the absence of the relatively warm object (e.g., an empty room) is detectable from image 400B. Computing system 102 may use similar images to train models 216 on routine behavior in the environment.

After training, computing system 102 may obtain a new image of a feature long and flat at the bottom of the image (e.g., a human fallen to the floor). Such a feature would not be comparable to the features from the images used for training. Computing system 102 may recognize the image as an outlier and perform an alert action.

In this way, computing system 102 may monitor the behavior of subscriber 108. Monitoring the behavior of subscriber 108 may not require images of high resolution. For example, images 400A-B are of low resolution, such that the detailed activity of feature 404 and the detailed setup of the environment remain unknown, yet computing system 102 may still detect the routine behavior of subscriber 108.

Figure 5A:
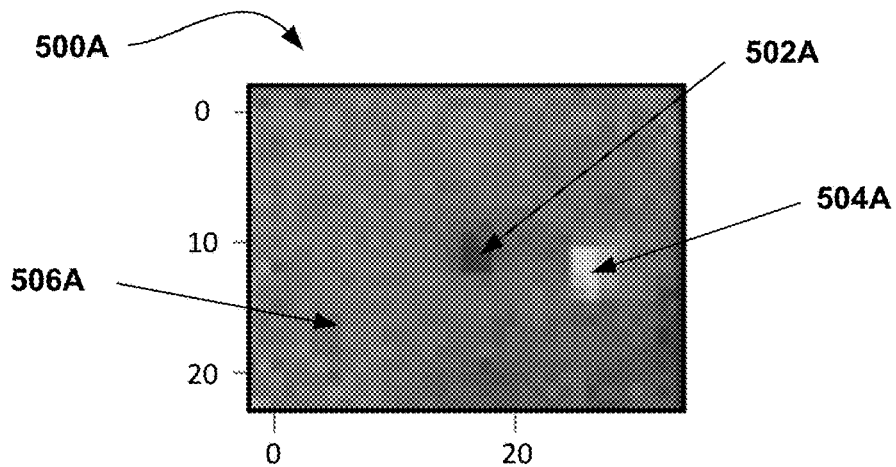
FIGS. 5A-C are conceptual diagrams illustrating an example encoding and decoding process by an autoencoder.
Figure 5B:
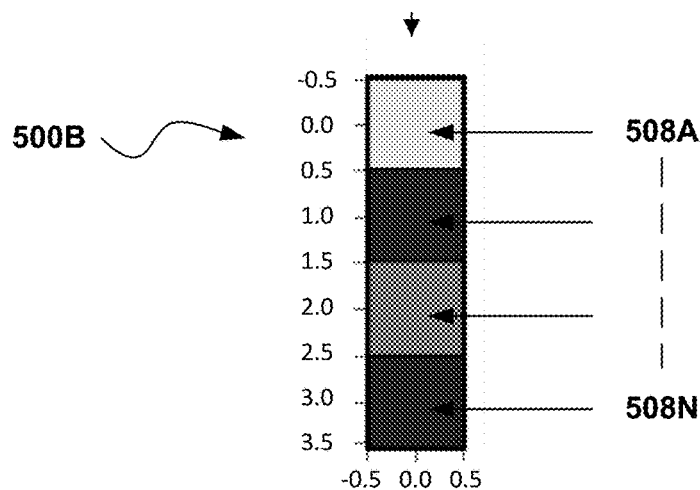
Figure 5C:
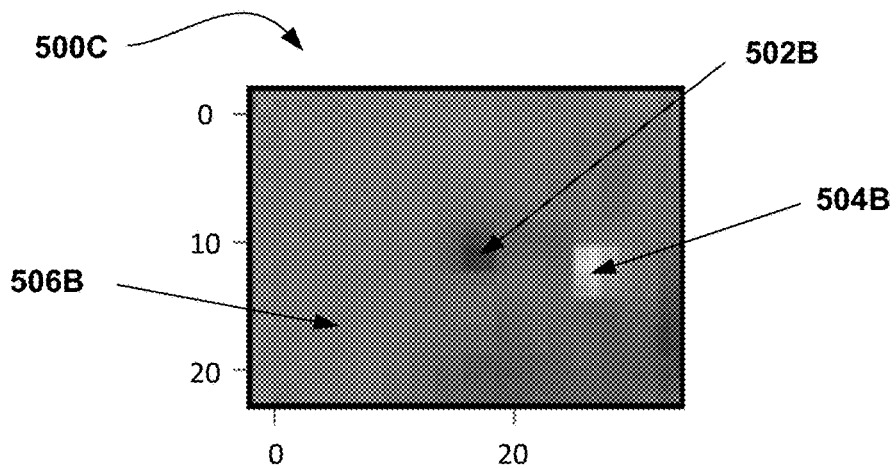

FIGS. 5A-C are conceptual diagrams illustrating an example encoding and decoding process by an autoencoder, such as the autoencoder of models 216. The autoencoder may compress thermal images of an environment from thermal imaging camera system 104 into codes representative of the images.

FIG. 5A shows an example thermal image 500A with low-temperature feature 502A, high-temperature feature 504A, and moderate-temperature background 506A. Low-temperature feature 502A and high-temperature feature 504A may be distinguishing characteristics of the environment that reflect behavior of subscriber 108.

FIG. 5B shows an example code 500B, such as a code output by the autoencoder, representative of one or more thermal images, such as thermal image 500A. The code may contain any number of values, such as values 508A-N (collectively, "values 508"), to encapsulate the distinguishing characteristics of the one or more thermal images.

The number of values may correlate with the complexity of the code, such that a lower number of values correlates with a lower complexity of the code and a higher number of values correlates with a higher complexity of the code. A lower complexity may reduce the storage and processing requirements for computing system 102. In some cases, the code may be a series of pixels, as depicted in the example of FIG. 5B. In other cases, the code may be a numerical representation, such as a vector.

FIG. 5C shows an example thermal image 500C with low-temperature feature 502B, high-temperature feature 504B, and moderate-temperature background 506B, as reconstructed by the autoencoder from code 500B.

The autoencoder includes an encoder and a decoder. The encoder may receive, as input, thermal images and produce, as output, a code representative of the thermal images. In some cases, the encoder may map one thermal image (e.g., image 500A) to one code (e.g., code 500B). In other cases, the encoder may map two or more thermal images to one code. Subsequently, the decoder may receive, as input, the code (e.g., code 500B) and produce, as output, a thermal image (e.g., 500C). For example, the decoder may produce an image similar to the inputted thermal image. As another example, the decoder may produce an image with some reconstruction error relative to the inputted thermal image.

Computing system 102 may have trained the autoencoder on thermal images from the environment. The accuracy of the autoencoder in compressing a new image may depend on the similarity of the new image to the images used for training. In some cases, image 500A is similar to the training images. In such cases, the encoder may form an accurate representation of image of 500A in code 500B such that the decoder will reconstruct, from code 500B, image 500C that is highly similar to image 500A. In other cases, image 500A is dissimilar to training images. In such cases, the encoder will form a poor representation of image 500A in code 500B such that the decoder will reconstruct, from code 500B, image 500C that has a high reconstruction error compared to image 500A. In some cases, computing system 102 may use the reconstruction error to identify outliers in the clustering model of models 216. For example, a reconstruction error that meets an error threshold may identify image 500A as an outlier, and computing system 102 may therefore perform an alert action.

Values 508A-N of code 500B may reflect distinguishing characteristics of image 500A. As a result, other images containing similar temperature variations in similar locations to those in image 500A may have similar codes. The clustering model of models 216 may cluster codes based on values 508A-N, such that the model groups image 500A and the other images together. In this way, the clustering model forms clusters of features, activities, and/or events of subscriber 108 in the environment.

Figure 6:
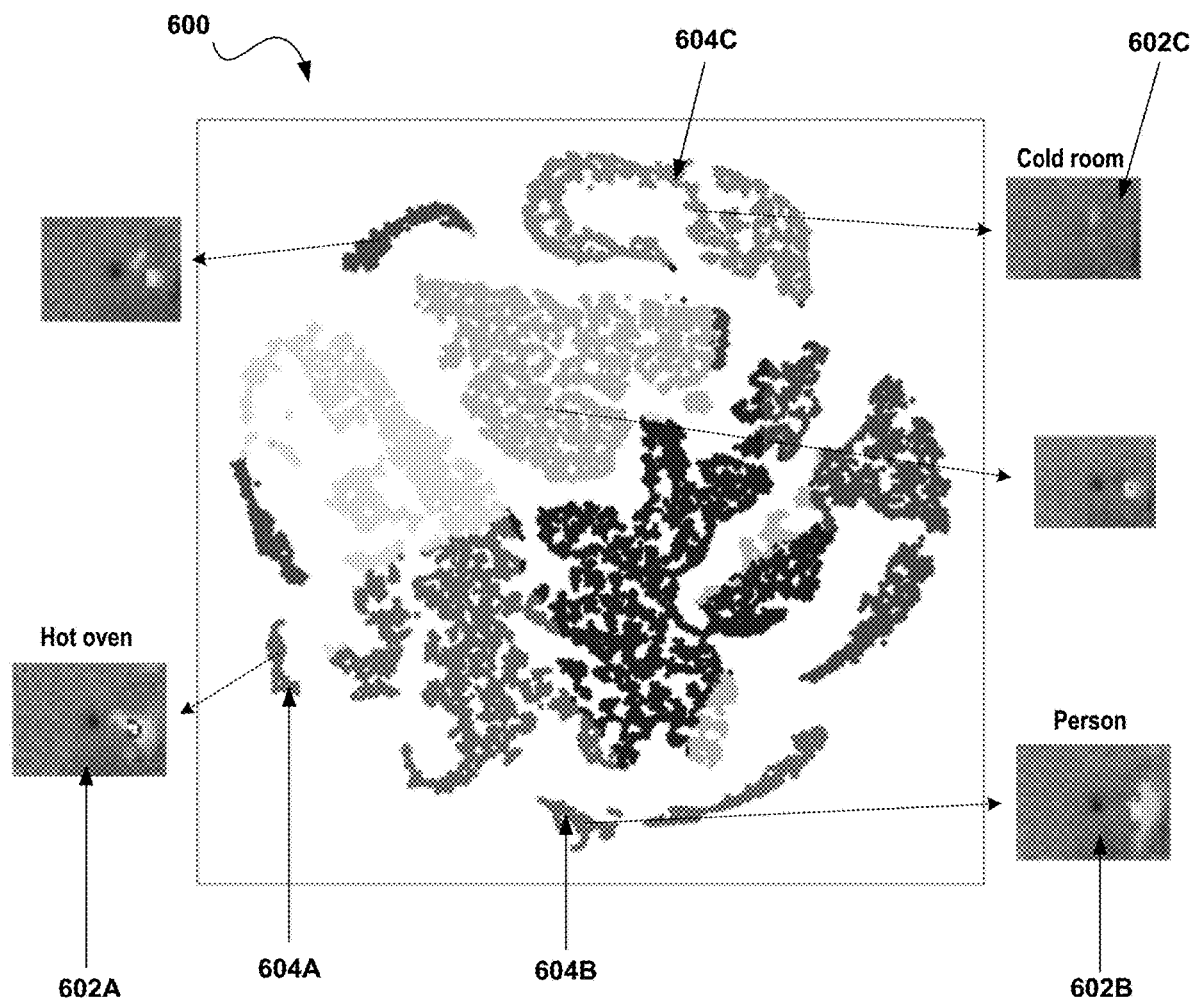
FIG. 6 is a conceptual diagram illustrating an example plot of codes corresponding to activities and features in an environment monitored by thermal imaging cameras.

FIG. 6 is a conceptual diagram illustrating an example plot 600 of codes grouped into clusters, including clusters 604A-C (collectively, "clusters 604"), corresponding to activities and features, including features 602A-C respectively (collectively, "features 602"), in an environment monitored by thermal imaging camera system 104.

On plot 600, each data point represents one or more codes, at a location corresponding to a t-SNE dimensionally reduced representation. In other examples, the location may correspond to a dimensionally reduced representation from a PCA or an ICA algorithm. In yet other examples, each data point may be a direct output of the autoencoder. Plot 600 further shows the results of an initial training of the clustering model of models 216. The clustering model has determined that the data points form clusters, as differentiated by color. For example, the clustering model has determined that the data points of cluster 604A and the data points of cluster 604B belong to a single cluster.

When computing system 102 elicits feedback from subscriber device system 106, the feedback enhances the information about the data points that the clustering model used to determine clusters. Due to the feedback, the data points may gain labels. For example, the feedback identifies data points in cluster 604A as feature 602A (e.g., a hot oven), the data points in cluster 604B as feature 602B (e.g., a person), and the data points in cluster 604C as feature 602C (e.g., a cold room). Thus, the feedback indicates an error in the initial clustering model by identifying the features corresponding to cluster 604A as different from the features corresponding to cluster 604B. In another example, the feedback may identify two separate clusters as corresponding to the same feature of the environment, such that the two clusters should be one cluster.

After eliciting feedback, computing system 102 retrains the clustering model to consider the new labels of the data points. Computing system 102 may update the clustering model to join data points corresponding to a single feature into a single cluster, and/or to separate data points corresponding to two or more features into two or more clusters. The clustering model may discriminate between labelled data points in a single cluster and infer new labels for all data points in the cluster using, for example, linear discriminant analysis, quadratic discriminant analysis, regularized discriminant analysis, or polynomial regression. For example, the updated clustering model may show cluster 604A and cluster 604B as separate clusters.

Figure 7:
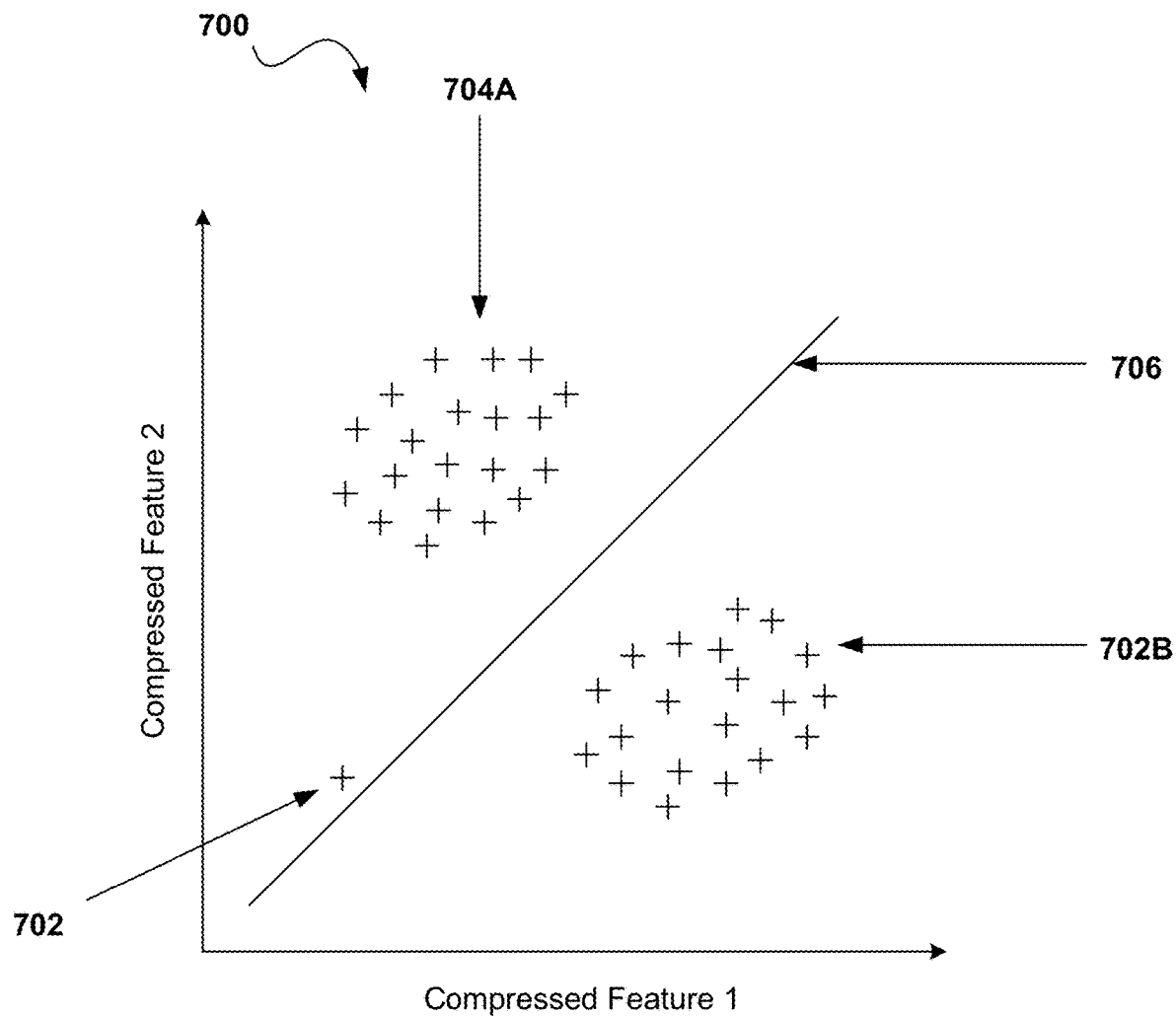
FIG. 7 is a conceptual diagram illustrating an example plot of clustered and anomalous codes.

FIG. 7 is a conceptual diagram illustrating an example plot 700 of code clusters and an anomalous code. Plot 700 includes codes from the autoencoder mapped according to relative values of two compressed features. The clustering model of models 216 has determined that codes in cluster 704A are distinct from codes in cluster 704B, and the classification model of models 216 categorizes the codes into respective classes based on classifier discriminant 706. New code 702 either belongs to cluster 704A, belongs to cluster 704B, or is an anomalous code.

During training, the clustering model determines naturally occurring groups of codes. For example, the clustering model may determine that the set of codes corresponding to cluster 704A and the set of codes corresponding to cluster 704B are distinct clusters.

Computing system 102 trains the classification model using feedback from subscriber device system 106 as labels for codes. For example, computing system 102 may label the codes corresponding to cluster 704A as "watching TV" and the codes corresponding to cluster 704B as "vacuuming." During training, the classification model may distinguish a "watching TV" class from a "vacuuming" class with classifier discriminant 706.

In the event of obtaining new code 702, computing system 102 determines whether new code 702 is anomalous by comparing new code 702 to the codes composing clusters 704A-B using a similarity measure. In some cases, although the classification model may classify new code 702 into the class corresponding to cluster 704A, the clustering model may determine from the dissimilarity of new code 702 to the codes composing clusters 704A-B that new code 702 is anomalous. For example, the similarity of new code 702 to the codes composing clusters 704A-B may not meet a threshold similarity to constitute belonging to clusters 704A-B. In such cases, computing system 102 may perform an alert action.

In other cases, the clustering model may determine that new code 702 is sufficiently similar to clusters 704A-B as not to be anomalous. For example, the similarity of new code 702 to the codes composing clusters 704A-B may meet a threshold similarity. In such cases, computing system 102 may use the classification model to classify new code 702 into a class, and the classification model, based on classifier discriminant 706, may determine that new code 702 belongs to the class corresponding to cluster 704A.

Figure 8A:
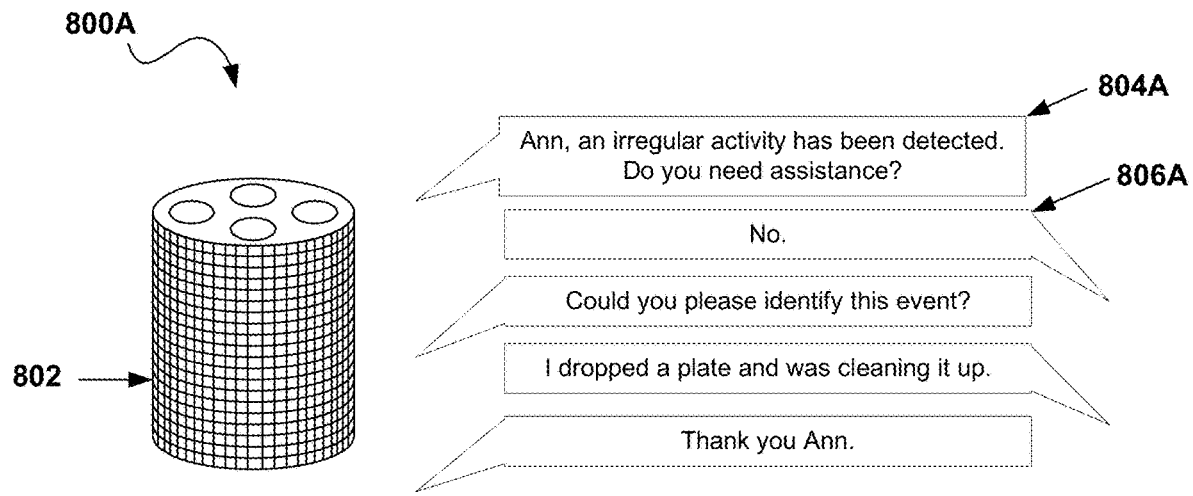
FIGS. 8A-C are example scenarios of a computing system communicating via a device associated with a user.
Figure 8B:
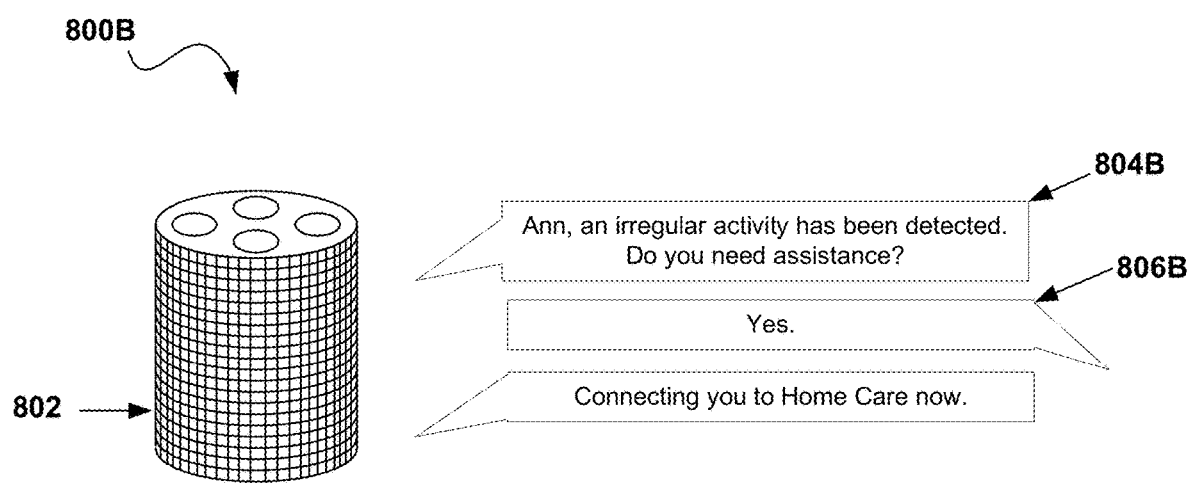
Figure 8C:
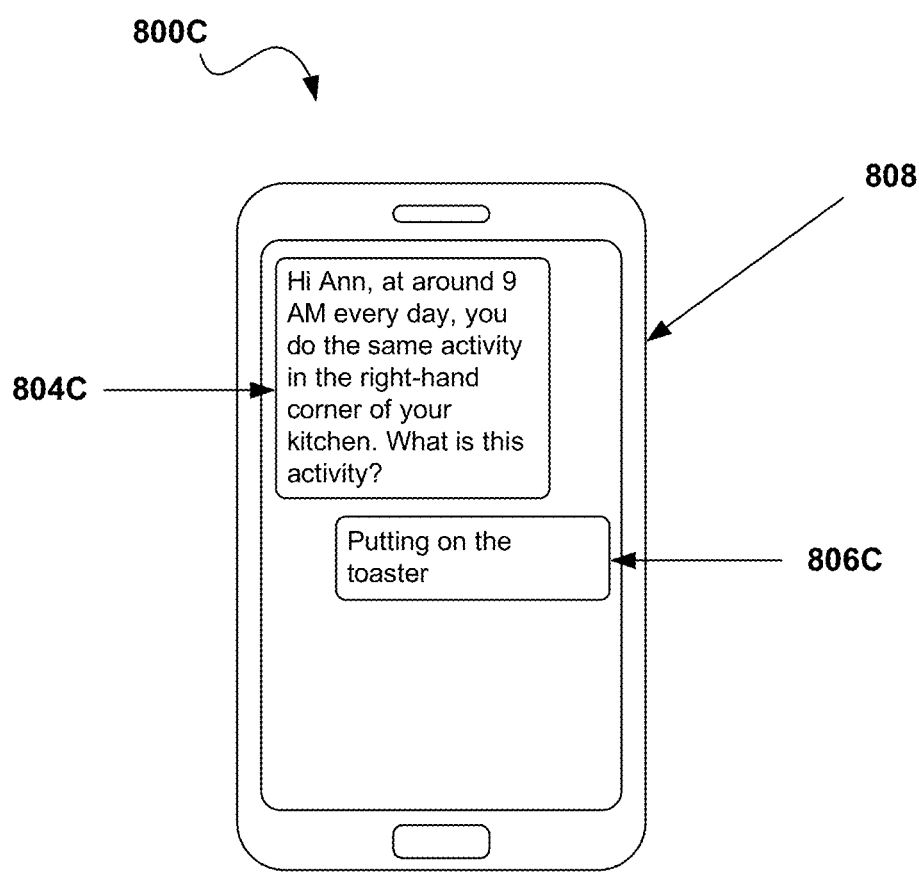

FIGS. 8A-C are example scenarios of computing system 102 communicating via subscriber device system 106. In some cases, computing system 102 communicates via subscriber device system 106 as an alert action in response to detecting an outlier code. In other cases, computing system 102 communicates via subscriber device system 106 for an identification of a feature, activity, or event in the monitored environment of subscriber 108.

Computing system 102 may send a notification to subscriber device system 106. Subscriber device system 106 may include one or more devices belonging to subscriber 108 and/or users associated with subscriber 108, such as friends or family of subscriber 108. In some cases, subscriber 108 may respond to the notification. In other cases, another user associated with subscriber 108 may respond. Subscriber device system 106 may include a variety of devices, such as smart speakers, mobile phones (e.g., smartphones), tablets, etc. Computing system 102 may send a notification in any format, such as audio or written. Subscriber 108 and/or another user associated with subscriber 108 may respond in any format, such as audio or written.

FIG. 8A shows an example scenario 800A of computing system 102 communicating with subscriber 108 via smart speaker 802. Computing system 102 may initiate communication by sending audio notification 804A to smart speaker 802. Computing system 102 may initiate communication in response to detecting an anomalous code with the clustering model of models 216, suggestive of abnormal behavior by subscriber 108. Notification 804A may prompt subscriber 108 to confirm or deny that an actionable event (i.e., an event that requires follow-up, such as by medical help or security support) has occurred. Subscriber 108 may respond with audio response 806A. In the example shown in scenario 800A, response 806B denies that an actionable event has occurred. In some cases, computing system 102 may, via an additional notification, prompt subscriber 108 for additional information identifying the event that occurred. Subscriber 108 may, via additional responses, provide computing system 102 with an identification of the event. Computing system 102 may use the identification as a label for the anomalous code. Computing system 102 may retrain models 216 so that new codes similar to the anomalous code are not considered outliers.

FIG. 8B shows an example scenario 800B of computing system 102 communicating with subscriber 108 via smart speaker 802. Computing system 102 may initiate communication by sending audio notification 804B to smart speaker 802. Computing system 102 may initiate communication in response to detecting an anomalous code with the clustering model of models 216, suggestive of abnormal behavior by subscriber 108. Notification 804B may prompt subscriber 108 to confirm or deny that an actionable event (i.e., an event that requires follow-up, such as by medical help or security support) has occurred. Subscriber 108 may respond with audio response 806B. In the example shown in scenario 800B, response 806B confirms that an actionable event has occurred. In other examples, computing system 102 may not receive a response or may receive an incoherent response and may interpret such a response as a confirmation that an actionable event has occurred. In response to the confirmation, computing system 102 may send an additional notification to the organization associated with computing system 102, such as a healthcare provider or a security provider, alerting the organization of the follow-up required by subscriber 108. For example, the additional notification may be an audio message, a written message, or a binary signal like an alarm.

FIG. 8C shows an example scenario 800C of computing device 102 communicating with subscriber 108 via smartphone 808. Computing system 102 may initiate communication by sending written notification 804C to smartphone 808. Notification 804C may prompt subscriber 108 to identify a feature, activity, or event associated with distinguishing characteristics of a cluster. Distinguishing characteristics may include, for example, a location, a time, a temperature, or a shape of a feature in the environment. In the example depicted by scenario 800C, distinguishing characteristics include the time "9 AM" and the location "right-hand corner of your kitchen." Subscriber 108 may provide, via written response 806C, an identification of the event, such as "putting on the toaster." Computing system 102 may use the identification or description as a label for the codes in the cluster. Computing system 102 may retrain the clustering model and/or the classification model of models 216 to use the new labels when determining clusters and/or classes.

Additionally or alternatively, computing system 102 may send a notification to subscriber device system 106 for other reasons. Based on the learned routine behavior, computing system 102 may supplement the abilities of subscriber 108 with additional help. For example, computing system 102 may send a notification reminding subscriber 108 to take a medication when in the kitchen.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    training, by a computing system, an autoencoder neural network to generate a first set of codes representative of a first set of thermal video images of activities of a user in an environment, wherein:
        the activities of the user represent routine behaviors of the user in the environment,
        the autoencoder neural network comprises an encoder and a decoder, and
        training the autoencoder neural network comprises:
            applying the encoder to encode the first set of thermal video images of the user to generate the first set of codes;
            applying the decoder to decode the first set of codes to reconstruct the first set of thermal video images of the activities of the user; and
            determining reconstruction errors of the reconstructed first set of thermal video images of the images of the activities of the user;

categorizing, with an unsupervised machine-learning algorithm, the first set of codes into a set of clusters;

after categorizing the first set of codes into the set of clusters, determining, with the autoencoder neural network, a code representative of a second set of thermal video images of an activity in the environment;

determining, by the computing system, that the code is an anomalous code based on the code not being associated with any cluster in the set of clusters; and based on the anomalous code, performing, by the computing system, an alert action.

2. The method of claim 1, wherein performing the alert action comprises:

prompting, via a device associated with the user, a response to indicate whether the activity is an actionable event.

3. The method of claim 2, wherein the response is supplied, via the device, by the user or by a trusted associate of the user.

4. The method of claim 1, wherein performing the alert action comprises performing, by the computing system, the alert action based on a cluster from the set of clusters, wherein the cluster corresponds to routine behavior.

5. The method of claim 4, wherein performing the alert action based on the cluster comprises:

prompting, via a device associated with the user, a first response from the user or trusted associate of the user to identify a first name of a first activity; and labelling, with the first name of the first activity, a first cluster that corresponds to the first activity.

6. The method of claim 5, further comprising:

determining, in the first cluster, codes labelled with a second name; and separating codes labelled with the first name from codes labelled with the second name by splitting the first cluster into two clusters.

7. The method of claim 5, further comprising:

determining a second cluster that corresponds to a second activity with a second name;

determining that the first name and the second name are similar; and combining the first cluster and the second cluster into one cluster corresponding to the first activity with the first name.

8. The method of claim 5, wherein performing the alert action based on the cluster only occurs for a cluster containing a minimum number of codes.

9. The method of claim 1, wherein performing the alert action comprises prompting, via a device associated with the user, a response to indicate whether the activity is an actionable event, wherein the actionable event is a fall of the user.

10. The method of claim 1, wherein the first set and the second set of thermal video images are received from one or more thermal imaging cameras in the environment.

11. The method of claim 1, wherein the set of clusters is a plurality of clusters corresponding to a plurality of routine behaviors of the user in the environment.

12. The method of claim 1, further comprising:

determining that the code is not the anomalous code; and classifying the code into a cluster from the set of clusters, wherein the cluster contains one or more codes that share one or more characteristics with the code.

13. A system comprising:

one or more memory units; and one or more processors in communication with the memory units, wherein the one or more processors are configured to:

train an autoencoder neural network to generate a first set of codes representative of a first set of thermal video images of activities of a user in an environment, wherein:

the activities of the user represent routine behaviors of the user in the environment, the autoencoder neural network comprises an encoder and a decoder, and the one or more processors are configured to, as part of training the autoencoder neural network:

apply the encoder to encode the first set of thermal video images of the user to generate the first set of codes;

apply the decoder to decode the first set of codes to reconstruct the first set of thermal video images of the activities of the user; and determine reconstruction errors of the reconstructed first set of thermal video images of the images of the activities of the user;

categorize, with an unsupervised machine-learning algorithm, the first set of codes into a set of clusters;

determine, with the autoencoder neural network, a code representative of a second set of thermal video images of an activity in the environment;

determine that the code is an anomalous code based on the code not being associated with any cluster in the set of clusters; and perform, based on the anomalous code, an alert action.

14. The system of claim 13, wherein the one or more processors are configured to:

prompt, via a device associated with the user, a response to indicate whether the activity is an actionable event.

15. The system of claim 13, wherein the one or more processors are configured to:

prompt, via a device associated with the user, a first response from the user or trusted associate of the user to identify a first name of a first activity corresponding to a first cluster from the set of clusters; and label, with the first name of the first activity, the first cluster.

16. The system of claim 15, wherein the one or more processors are configured to:

determine, in the first cluster, codes labelled with a second name; and separate codes labelled with the first name from codes labelled with the second name by splitting the first cluster into two clusters.

17. The system of claim 15, wherein the one or more processors are configured to:

determine a second cluster that corresponds to a second activity with a second name;

determine that the first name and the second name are similar; and combine the first cluster and the second cluster into one cluster corresponding to the first activity with the first name.

18. The system of claim 13, wherein the one or more processors are configured to:

determine that the code is not the anomalous code; and classify the code into a cluster from the set of clusters, wherein the cluster contains one or more codes that share one or more characteristics with the code.

19. A non-transitory computer-readable storage medium comprising instructions that, when executed, cause at least one processor of a computing device to:
- train an autoencoder neural network to generate a first set of codes representative of a first set of thermal video images of activities of a user in an environment, wherein:
  - the activities of the user represent routine behaviors of the user in the environment;
  - the autoencoder neural network comprises an encoder and a decoder, and
  - the instructions that cause the at least one processor to train the autoencoder neural network comprise instructions that, when executed, cause the at least one processor to:
    - apply the encoder to encode the first set of thermal video images of the user to generate the first set of codes;
    - apply the decoder to decode the first set of codes to reconstruct the first set of thermal video images of the activities of the user; and
    - determine reconstruction errors of the reconstructed first set of thermal video images of the images of the activities of the user
- categorize, with an unsupervised machine-learning algorithm, the first set of codes into a set of clusters;
- determine, with the autoencoder neural network, a code representative of a second set of thermal video images of an activity in the environment;
- determine that the code is an anomalous code based on the code not being associated with any cluster in the set of clusters; and
- perform, based on the anomalous code, an alert action.

* * * * *